(12) United States Patent
Saeki (10) Patent No.: US 6,447,052 B2
(45) Date of Patent: Sep. 10, 2002

(54) BODY STRUCTURE FOR VEHICLE

(75) Inventor: Hidetsugu Saeki, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/795,087

(22) Filed: Mar. 1, 2001

(30) Foreign Application Priority Data

Mar. 10, 2000 (JP) ........................................ 2000-066478

(51) Int. Cl.7 ............................................... B62D 27/00
(52) U.S. Cl. ........................ 296/188; 296/189; 296/209; 296/203.03; 296/29
(58) Field of Search .................. 296/188, 189, 296/194, 193, 203.03, 203.02, 209, 205, 29, 30, 203.01

(56) References Cited

U.S. PATENT DOCUMENTS

| | | | | |
|---|---|---|---|---|
| 4,189,177 A | * | 2/1980 | Schuchow et al. | 296/188 |
| 5,586,799 A | * | 12/1996 | Kanemitsu et al. | 296/188 X |
| 6,139,093 A | * | 10/2000 | Elliott et al. | 296/203.02 |
| 6,209,950 B1 | * | 4/2001 | Hanyu | 296/194 |
| 6,250,710 B1 | * | 6/2001 | Matsuzaki | 296/188 |
| 6,299,237 B1 | * | 10/2001 | Benz et al. | 296/188 |
| 6,332,642 B1 | * | 12/2001 | Hanyu | 296/203.02 |

FOREIGN PATENT DOCUMENTS

| | | |
|---|---|---|
| DE | 4040979 A1 | 7/1992 |
| DE | 4335029 A1 | 4/1995 |
| JP | 10-7020 | 1/1998 |
| WO | WO 97/41010 | 11/1997 |

* cited by examiner

Primary Examiner—Joseph D. Pape
(74) Attorney, Agent, or Firm—McDermott, Will & Emery (57) ABSTRACT

The pillar structure to which the passenger cabin end of the hood ridge panel is connected, is arranged have different localized structural deformation resistances which buckle/deform in a manner which causes the hood ridge panel to reorient in response to a vehicle structure deforming force being applied to the front of the vehicle during a collision, and results in the force, which passes through the hood ridge panel, being redirected by a load-converting and transmitting member included in the pillar, up and along an upper rearwardly angled upper portion of the pillar. This force redirection produces sufficient resistance to induce compressive bucking in the structure forward of the passenger cabin and thus attenuate damage to the cabin structure.

22 Claims, 8 Drawing Sheets

BODY STRUCTURE FOR VEHICLE

BACKGROUND OF THE INVENTION

1. Field of the Invention

The present invention relates generally to an automotive body structure. More specifically, the present invention relates to the structure of a front pillar section of an automobile body that includes a reinforcement/structural deformation resistance control arrangement that achieves impact force re-direction and improvement in frontal impact safety.

2. Description of the Related Art

Japanese Unexamined Patent Publication (kokai) No. 10-7020 discloses an automotive body structure that is equipped with an arrangement for absorbing collision/impact energy. In this structure, the energy absorbing arrangement is located at the lower ends of. each front pillar and at a level that is opposite each of the. front wheels. With the arrangement, energy is absorbed in the event that the forward wheels are forced back under the impact to the degree that they deformingly engage the forward surfaces of the lower ends of the front pillars.

In the above-mentioned structure, while it will be expected that this energy absorbing arrangement would contribute to impact energy absorption at the time of the interference with the front wheels and the other automotive front members. However, it may not contribute to the absorption of the impact energy before the front wheel contacts the lower pillar. Accordingly, there still exists a need for a structure that can improve the impact energy provided by the vehicle cabin in the event of a severe head-on collision or the like.

SUMMARY OF THE INVENTION

It is an object of the present invention to provide a body structure for a vehicle that is capable of effectively inducing predetermined amounts of buckling (structural) deformation of the structural member(s) located immediately in front of the passenger compartment and which redirects the impact force through an upper portion of the front pillar in a manner that improves collision energy absorbing characteristics of the automotive vehicle.

These and other objects of the invention are satisfied by an embodiment of the invention, which provides a body structure for a vehicle, comprising: a front pillar having a lower pillar portion and an upper pillar portion, the upper pillar portion merging with an upper end of the lower pillar, the upper pillar portion being angled toward a rear of the vehicle with respect to the lower pillar portion; a hood ridge member extending longitudinally along a side of the vehicle structure, the hood ridge member having a rear end portion joined to an upper end of the lower pillar portion; and a load-converting and force transmitting arrangement comprising: a first structural feature which forms part of the front pillar, the first structural feature being arranged to induce structural deformation of a predetermined portion of the lower front pillar portion upon a predetermined amount of force being transmitted thereto through the hood ridge member as a result of a frontal collision of the vehicle, the first structural feature re-orienting at least a rear end portion of the hood ridge member, with respect to the front pillar, to an orientation where the rear end portion of the hood ridge member is at least partially aligned with the angled upper pillar portion and so that force is transmitted from the hood ridge member toward the upper front pillar portion, and a second structural feature which forms part of at least one of the upper and lower pillar portions and which is arranged to receive force from the hood ridge member and to direct the received force along the upper front pillar portion.

BRIEF DESCRIPTION OF THE DRAWINGS

The various features and advantages of the embodiments of the present invention will become more clearly appreciated as a detailed description thereof is given with reference to the appended drawings wherein.

DESCRIPTION OF THE PREFERRED EMBODIMENTS

FIRST EMBODIMENT

Figure 1:
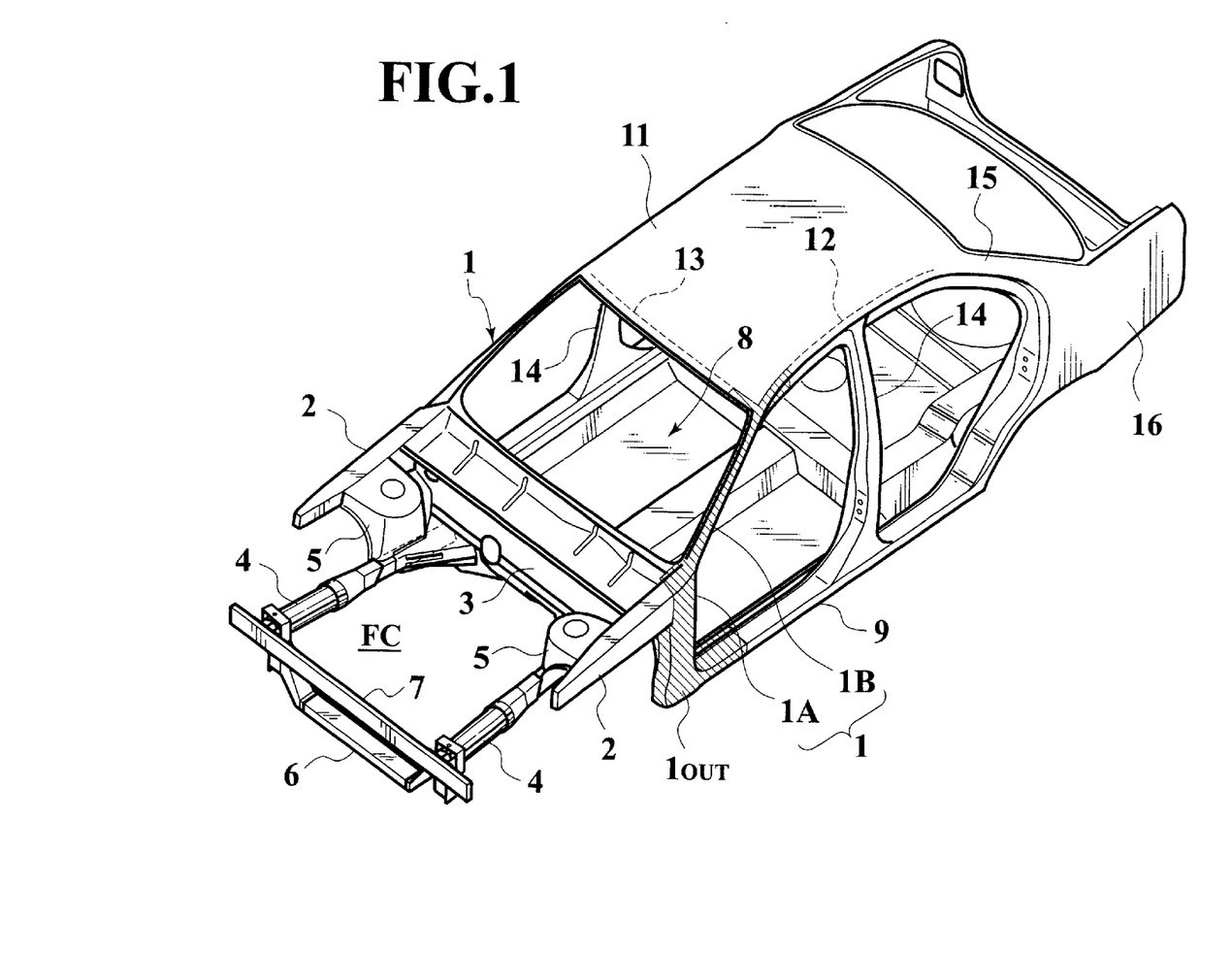
FIG. 1 is a perspective view of a body structure for a vehicle to which the embodiments of the present invention are applicable.

In FIG. 1, reference numerals 1 designate left and right front pillars each of which comprises of a substantially-upright lower pillar portion 1A and rearwardly obliquely angled upper pillar portion 1B which merges with and upper end of the lower pillar portion 1A.

Hood ridge members 2 are provided on each lateral side of the illustrated automotive body. In this arrangement, the rear or inboard ends of each hood ridge member 2 is abutted against and welded to a front face of an upper end of a lower pillar portion 1A.

Reference numeral 3 denotes a dash cross member while 4 designates front side members which are respectively coupled a side of the dash cross member 3. In order to strengthen the hood ridge members 2, the dash cross member 3 and the front side members 4, strut tower members 5 are respectively combined with these elements.

The front ends of the left and right front side members 4 are connected with each other through a first cross member 6 and a bumper armature 7. The front side members 4, the first cross member 6, the bumper armature 7, the hood ridge members 2, and the strut tower members 5 constitute the framework of a front compartment FC.

The respective lower ends of the left and right lower pillars 1A are joined to left and right side sills 9, respectively. These side sills 9 constitute a floor framework and extend down both sides of a floor member 8. The respective upper ends of the left and right upper pillars 1B are joined to left and right side roof rails 12 and a front roof rail 13. These elements 12, 13 constitute a roof framework of a roof panel 11.

In FIG. 1, reference numerals 14 denote center pillars, 15 one of the two rear pillars, and 16 one of the two rear fenders of the automotive body.

Figure 4:
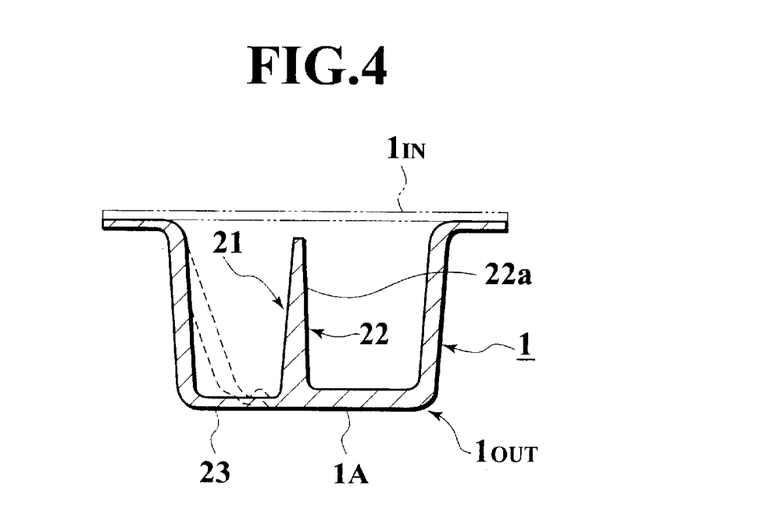
FIG. 4 is a sectional view taken along section line 4—4 of FIG. 3 showing structural deformation which occurs in accordance with the first embodiment.

In this embodiment, each front pillar 1 is, as best seen in FIG. 4, formed of a substantive outer member 1OUT and an inner member 1IN shown in two dot phantom.

Both members of the pillar are each formed as single integral or unitary body via casting of a corrosion resistant lightweight material, such as an aluminum alloy. In FIG. 1, the front end of the side sill 9, the front end of the side roof rail 12 and the lateral end of the front roof rail 13, are hatched for ready identification.

Figure 2:
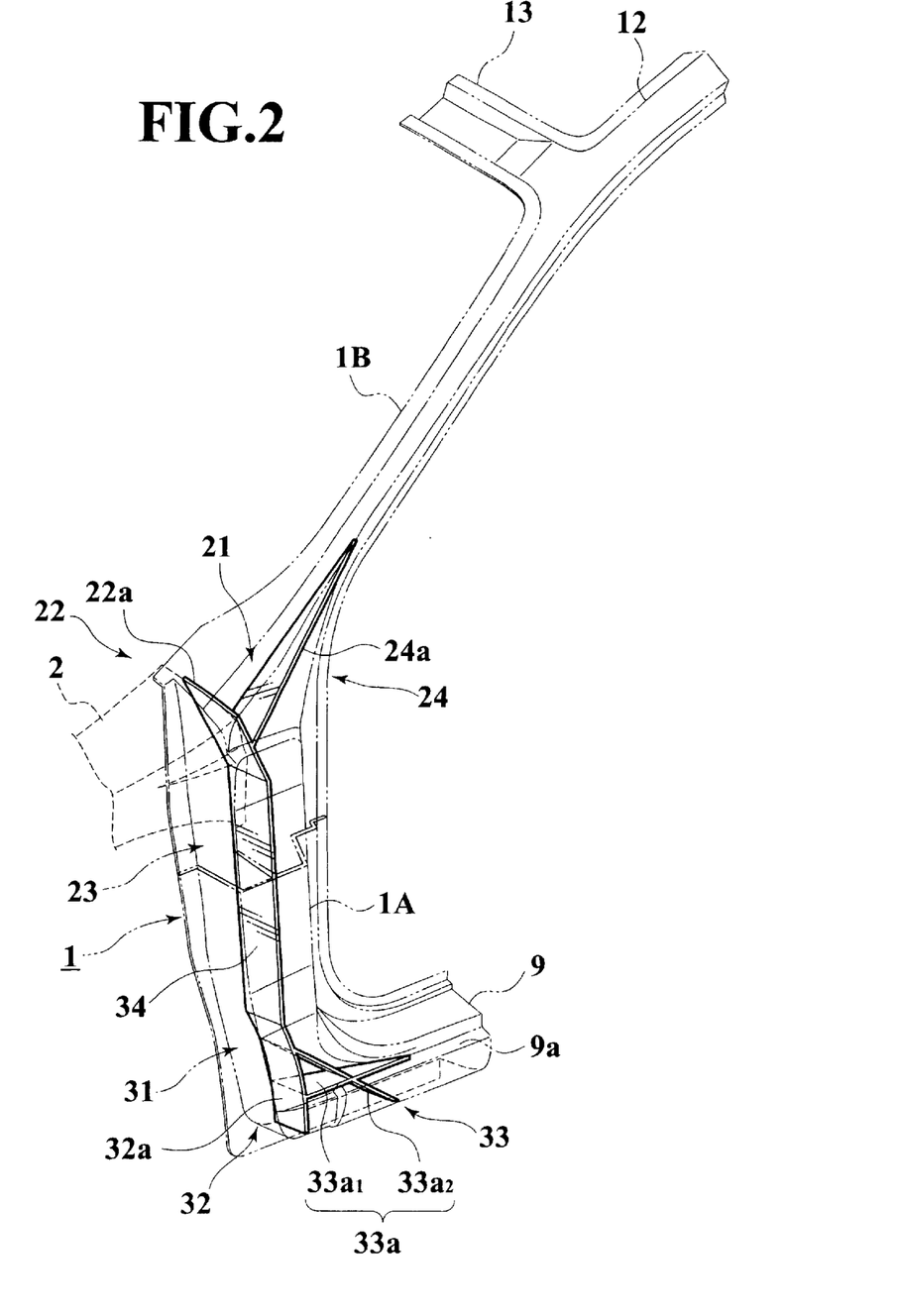
FIG. 2 is a perspective view depicting the essential body structural elements according to a first embodiment of the invention.
Figure 3:
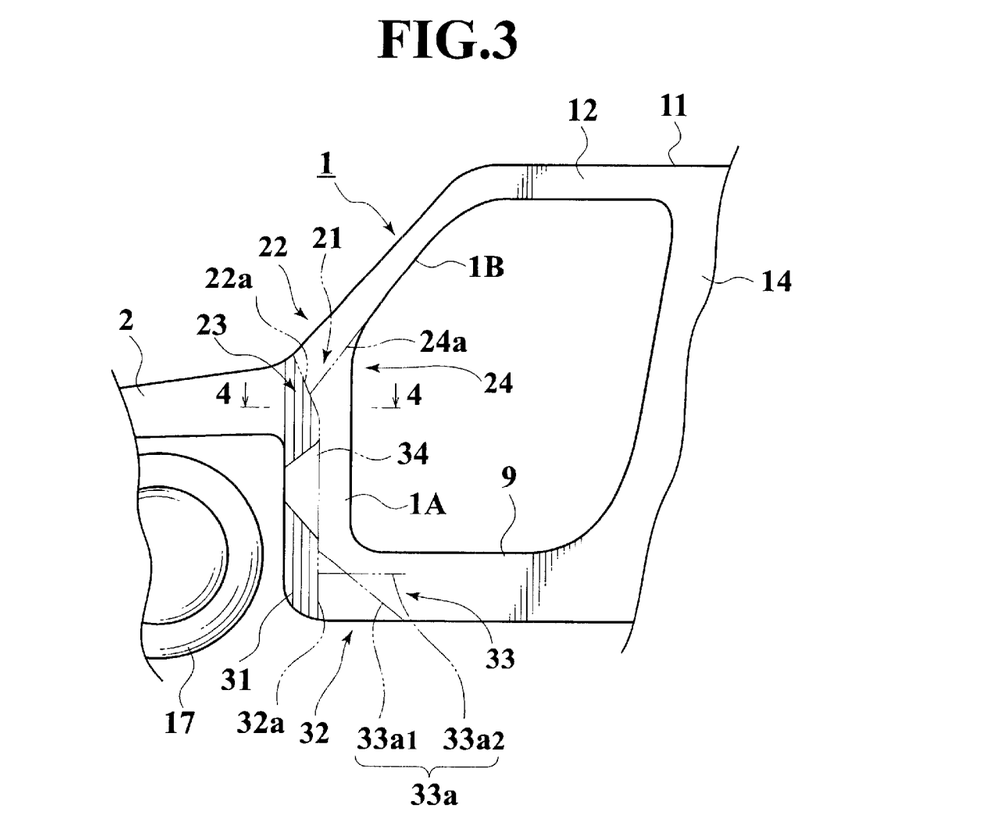
FIG. 3 is a schematic side view of body structure, which demonstrates various aspects of the first embodiment of the invention.

Additionally, as shown in FIGS. 2 and 3, each lower pillar 1A is provided with a load-converting and transmitting member 21 which converts and transmits a front and rear direction's force that the hood ridge member 2 has been subjected at the vehicle's collision, into a force in the axial direction of the upper pillar 1B.

The load-converting and transmitting member 21 includes a load-receiving part 22 which is arranged to extend from a site where the upper end of the lower pillar 1A to the hood ridge member 2 join, and which is inclined with respect to the lower pillar 1A for receiving a longitudinally acting collision force in a manner which will be described in more detail hereinafter.

A "weakened part" (viz., a portion or zone of relatively reduced structural deformation resistance) 23 (or first structural member) is provided forward and below the load-receiving part 22, and a reinforcement part 24 which supports the load-receiving part 22.

The load-receiving part 22 in this embodiment includes a slanted or angled rib 22a that is integrally or unitarily formed with the lower pillar 1A. The slanted or angled rib 22a has its upper edge joined to an upper wall of the hood ridge member 2 that is connected to the front pillar 1. On the other hand, the reinforcement part 24 has a reinforcement rib 24a, which is unitarily formed with both sidewalls of lower pillar 1A and upper pillar 1B. Additionally, the reinforcement rib 24a is continuously formed so as to extend from the center of the back face of the slanted rib 22a into the interior of the upper pillar portion 1B. In this way, the load-receiving part 22 and the reinforcement part 24 are respectively provided in the form of "rib" structures.

As shown in FIG. 4, the weakened part 23 is provided by the local control of the wall thickness of the lower pillar 1A. That is, according to this embodiment, the portion of the lower pillar which is located in front of the slanted rib 22a is formed so as to have a wall thickness which is less than that of the remaining upper portion of the lower pillar 1A.

In this manner the area of relatively reduced structural deformation resistance is provided through the reduced structural strength inherent with the reduced wall thickness. Further, at the lower end of the lower pillar 1A, another (second) "weakened" part 31 is provided on the front or forward side of the pillar at a location opposite the front wheel 17. Behind this weakened part 31, another (second) load-receiving member 32 is formed for receiving the longitudinally acting collision force, while another (second) reinforcement part 33 is formed there behind for supporting the load-receiving part 32. Note, these additional parts 31, 32, 33 are referred to the second weakened part 31, the load-receiving part 32 and the reinforcement part 33 to distinguish the same from the corresponding parts 23, 22, 24, located above.

Similarly to the load-receiving part 22 (or second structural feature) and the reinforcement part 24 of the load-converting and transmitting member 21, the load receiving part 32 and the reinforcement part 33 which are located in the lower portion of the lower pillar 1A, has "rib" structures unitarily formed with the lower pillar 1A. For example, in the embodiment, the load-receiving part 32 has a vertical rib 32a that is formed integrally with the lower pillar 1A and merges with the lateral and bottom wall surfaces (faces) thereof. Similarly, the reinforcement part 33 is also constituted by a reinforcement rib 33a that is formed integrally with the lower pillar 1A and the side sill 9. The reinforcement rib 33a is, as will become more evident hereinbelow, also configured to span the respective side faces of the lower pillar 1A and the side sill 9, and to extend from the substantial center of the back face of the vertical rib 32a into the interior of the side sill 9. The vertical rib 32a is, in this embodiment, arc-shaped so as to facilitate its surface-acceptance for the front wheel 17.

The reinforcement rib 33a comprises a first rib member 33a, which substantially horizontally connects the back face of the vertical rib 32a with a stepped shelf 9a formed on the side face of the side sill 9, and a second obliquely angled rib $33a_2$ which intersects with the first rib $33a_1$ and also connects the back face of the vertical rib 32a with the bottom face of the side sill 9.

Although not shown in detail, the second weakened part 31 at the lower end of the lower pillar 1A can be also be provided by controlling a localized portion of the wall thickness of the lower pillar 1A, as similar to the previous weakened part 23. For example, the forward wall of the portion of the lower pillar which is located in front of the vertical rib 32a is formed so as to have a wall thickness which less than that of adjacent wall portions and thus establish the so called weakened part 31.

The lowermost end of the slanted rib 22a of the load-converting and transmitting member 21 is continuously integrated with the uppermost end of the vertical rib 32a of the lower pillar 1A through the intermediary of a vertically extending connecting rib 34 formed unitarily with the inner face of the lower pillar 1A.

Note, although the above ribs 22a, 24a, 32a, 33a, 34 have been described as being unitarily formed with the outer member 1OUT, it will be noted that, as an alternative, the ribs can be unitarily formed with the inner member 1IN if so desired.

According to the above-mentioned embodiment, when the collision force which acts in the longitudinal fore-and-aft direction of the vehicle, acts on the hood ridge member 2 during a vehicular collision, the collision force is effectively re-oriented and transmitted from the lower pillar 1A of the front pillar 1 to the inclined upper pillar 1B by the load-converting and transmitting member 21. The thus transmitted force is then dissipated into the roof framework members, i.e., the side roof rail 12 and the front roof rail 13.

Consequently, while maintaining the reactive force of the hood ridge member 2 against compressive crushing at a higher level, the hood ridge member 2 can be positively deformed in buckling mode to accomplish the effective buckling deformation of the front compartment FC, thereby improving the collision energy absorbing characteristics of the vehicle.

In more detail, when the longitudinally acting collision force acts on the hood ridge member 2, the slanted or angled rib 22a having the load-receiving part 22 of the load-converting and transmitting member 21, receives the collision force and, due to the disposition of the weakened part or zone 23 in front of the slanted rib 22a, induces deformation of this zone with the attendant reduction in resistance to forward motion of the lower portion of the hood ridge member 2. Accordingly, in response the bucking of the weakened part 23, the relative high structural deformation resistance which exists at the upper level of the hood ridge member 2 causes the hood ridge member 2 to pivot downwardly so that it becomes re-oriented and tends to become aligned with the upper pillar 1B in the manner illustrated in FIG. 5. In this way, it is possible to achieve load transmission to the upper pillar 1B effectively.

Figure 6:
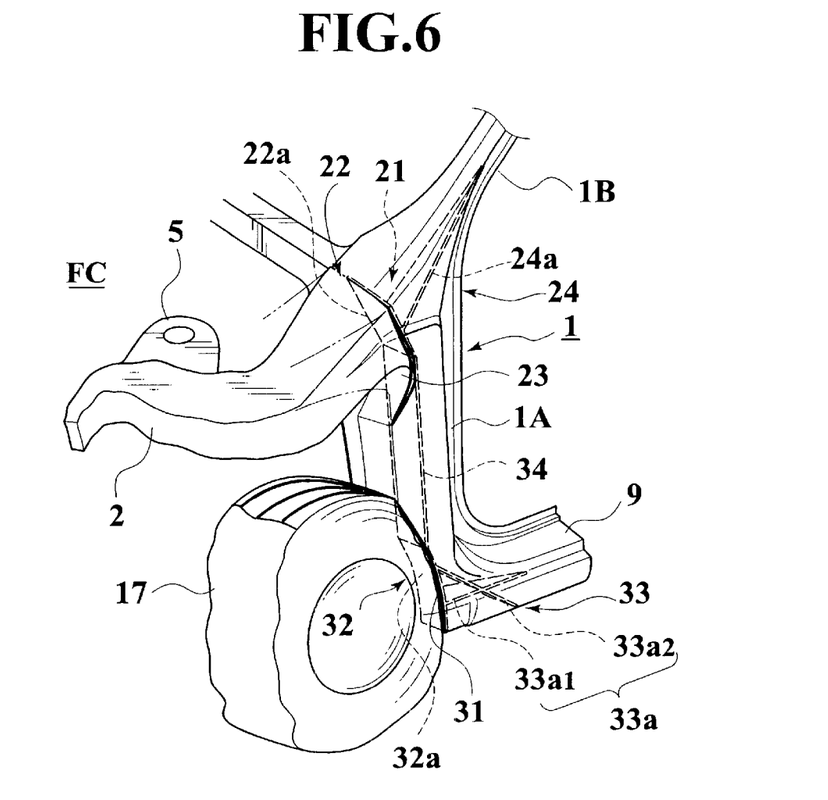
FIG. 6 is a perspective view showing the deformation, which develops in accordance with the first embodiment during subsequent stages of vehicle deformation.

Again, as shown in FIG. 6, even if the buckling deformation of the weakened part 23 permits the rear end of the member 2 to butt against the bottom of the slanted rib 22a, the load transmission to the side of the upper pillar 1B is still maintained during the latter stages of hood ridge buckling deformation since the slanted or angled rib 22a is reinforced by the reinforcement rib 24a. Therefore, due to the controlled buckling deformation induced in the lower pillar 1A through the provision of the weakened part 23, it is possible to improve the collision energy absorbing characteristics of the vehicle due to the buckling deformation of the front compartment FC including the hood ridge member 2 and thus increase the amount of collision energy absorbed.

Above all, since the reinforcement rib 24a is formed integrally with the upper pillar 1B from the back face of the slanted rib 22a to the inside of the upper pillar 1B in addition to the integral casting of the lower pillar 1A with the upper pillar 1B, it is possible to remarkably enhance the efficiency of load transmission in the axial direction of the upper pillar 1B.

Additionally, the slanted or angled rib 22a has an upper end or edge joined to the upper wall of the hood ridge member 2. Thus, if the strut tower 5 is subjected to an upwardly acting thrust or force, it is possible to maintain the resistance of the strut tower 5 to such a force due to the tensile strength of the slanted rib 22a.

Figure 5:
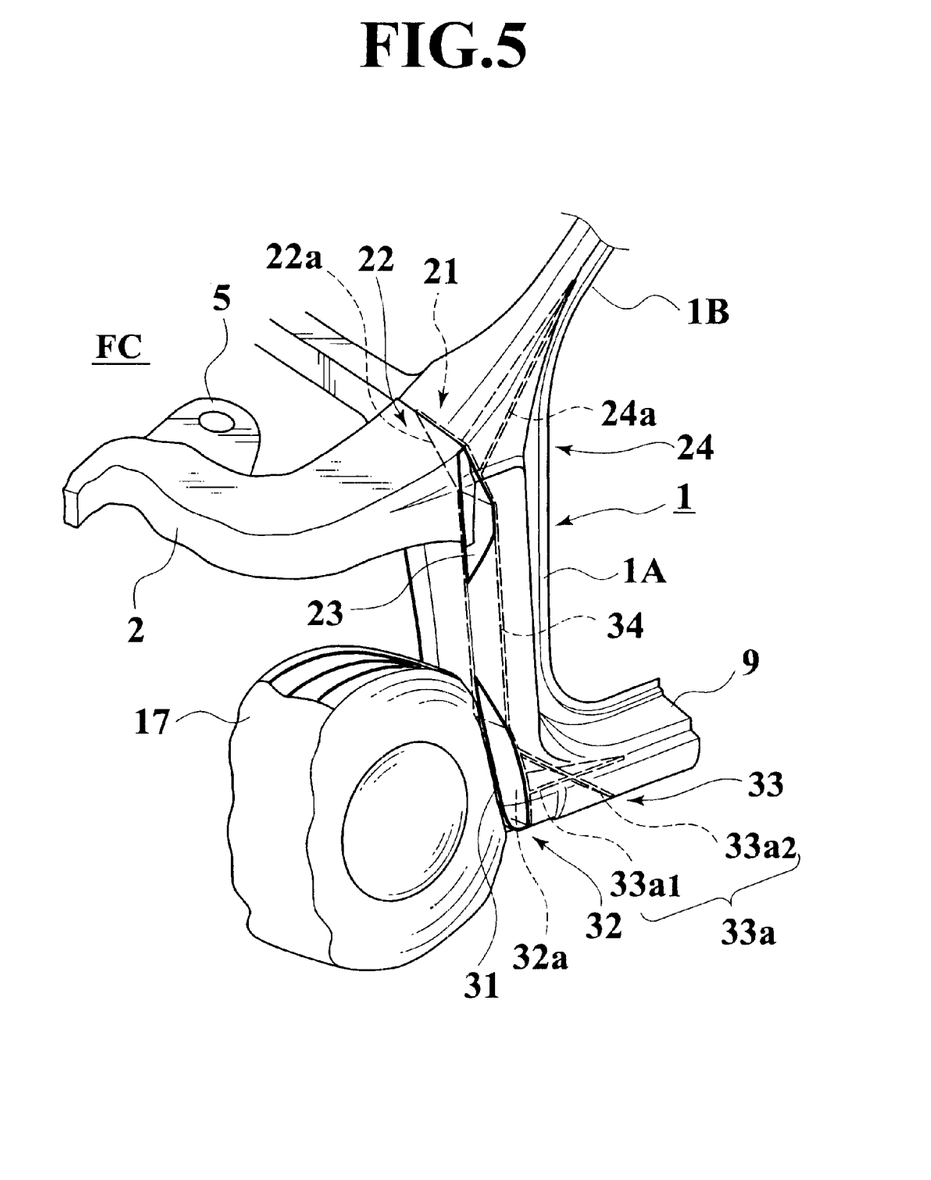
FIG. 5 is a perspective view of vehicular body structure showing the effect of the first embodiment and the initial type of deformation, which occurs as a result of a severe head-on type collision.

With the provision of the second lower weakened part 31, wherein the vertical rib 32a acts in the same manner as the load-receiving part 32 and the reinforcement rib 33a acts in the same manner as the reinforcement part 33, when the buckling deformation of the front compartment FC progress to the degree that the front wheel 17 engages and interferes with the lower end of the lower pillar 1A, collision energy can be further absorbed by the buckling deformation thereof, in the manner depicted in FIGS. 5 and 6.

It is to be furthermore noted that the buckling deformation of the weakened part 31 is restricted by the vertical rib 32a, as shown in FIG. 6. That is to say, when the wall structure which defines the weakened part 31 is forced back into contact with the vertical rib 32a by tire impact, the longitudinally acting force is received by the rib 32a and is then transmitted into the side sill 9 thus reducing the load bearing burden on the lower pillar 1A.

Since the reinforcement rib 33a is formed integrally with the lower pillar 1A and extends from the back face of the vertical rib 32a into the interior of the side sill 9, in addition to integral casting of the lower pillar 1A and the side sill 9 as a single body, the connecting rigidity between the lower pillar 1A with the side sill 9 is enhanced.

Additionally, the reinforcement rib 33a comprises a first substantially horizontal rib $33a_1$ which is connected with a shelf section 9a formed on the side face of the side sill 9, and thus exhibits a high surface rigidity, and the second rib $33a_2$ which is connected with the back face of the side sill 9 while obliquely intersecting with the first rib $33a_1$ in order to distribute the load into the side face and the bottom face of the side sill 9. Accordingly, it is possible to remarkably enhance the load transmissibility from the lower pillar 1B to the side sill 9.

Further, since the slanted/angled rib 22a located at the upper end of the lower pillar 1A is connected with the vertical rib 32a at the lower end of the lower pillar 1A through the connecting rib 34 formed integrally with the lower pillar 1A, the load transmissibility in the vertical direction of the lower pillar 1A is improved to enhance the load transmissibility to the upper pillar 1B and the side sill 9 even further.

Figure 7:
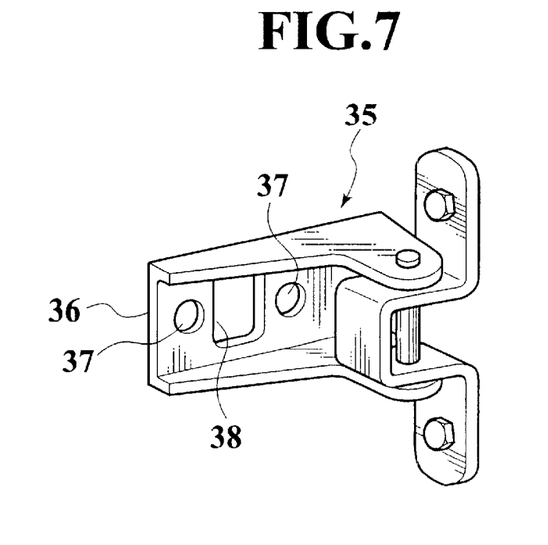
FIG. 7 is a perspective view of a door hinge employed in the first embodiment of the invention.

The above-mentioned lower pillar 1A is equipped with door hinges of the type illustrated in FIG. 7. These door hinges 35 are fastened to upper and lower points on an outboard side face of the lower pillar 1A through respective mounts or seat parts 36. However, if the door hinges 35 are fastened in a manner wherein their seat parts 36 are located at the same level as, and/or overlap either of the weakened parts or zones 23, 31, a problem may arise in that the "positive" (viz., controlled) requisite buckling deformation of the parts 23, 31 is modified by the existence of the seat parts 36. In this embodiment however, each door hinge 35 is provided, between front and rear fastening holes 37, 37, with an elongate hole 38 or the like. This feature reduces the structural reinforcing effect of the portion of the door hinge 35 (viz., the seat 38), and obviates the problem wherein the desired deformation of the "weakened" parts 23, 31 is inhibited.

Further, the weakened parts 23, 31 of this embodiment are respectively established by controlling the wall thickness of the lower pillar 1A and the load-receiving parts 22, 32 and the reinforcement parts 24, 33 are together provided in the form of "rib" structures. Therefore, these elements can be easily formed by means of casting and additionally, the distribution of plate/wall thickness and the rigidity of ribs can be adjusted to exhibit optimum characteristics through the control of wall thickness while taking advantage of the ease with which the products are cast.

Since the lower pillar 1A and the upper pillar 1B are cast into one body including the load-receiving parts 22, 32, the reinforcement parts 24, 33 and so on, it is possible to reduce the number of components, realizing the rationalization of the vehicle body.

SECOND EMBODIMENT

Figure 8:
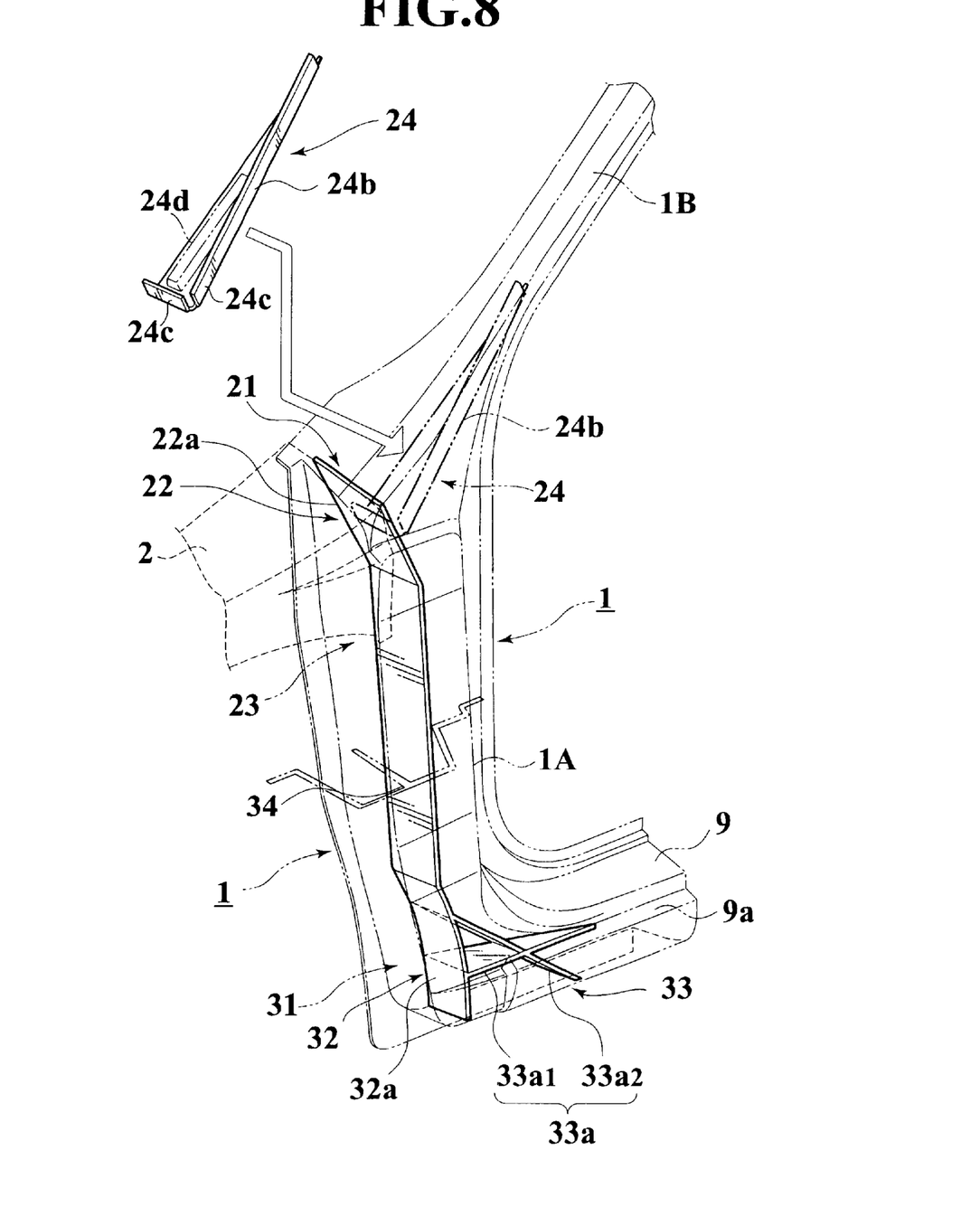
FIG. 8 is a perspective view showing a second embodiment of the invention.

FIG. 8 shows the second embodiment of the present invention. According to this embodiment, the reinforcement part 24 of the load-converting and transmitting member 21 is formed as a separate a reinforcement plate 24b which is connected to essentially the center of the rear face of the slanted or angled rib 22a, and arranged to extend back through the interior of the upper pillar 1B. The reinforcement plate 24b is secured in place by means of welding, bonding, etc.

Therefore, according to the second embodiment, it is possible to achieve essentially the same collision energy absorbing characteristics as the first embodiment. Additionally, owing to the provision of the reinforcement plate 24b which is separate (viz., not unitarily formed) from the upper pillar 1B, it is possible to achieve an increase in the freedom of design with respect to the front pillar 1 and the reinforcement part 24. Of course, by controlling both profile and thickness of flanges 24c and a bead 24d of the plate 24b in a suitable manner, it is also possible to control the characteristics of the reinforcement part 24 in terms of its reaction generating effect (viz., its force resisting/directing effect).

THIRD EMBODIMENT

Figure 9:
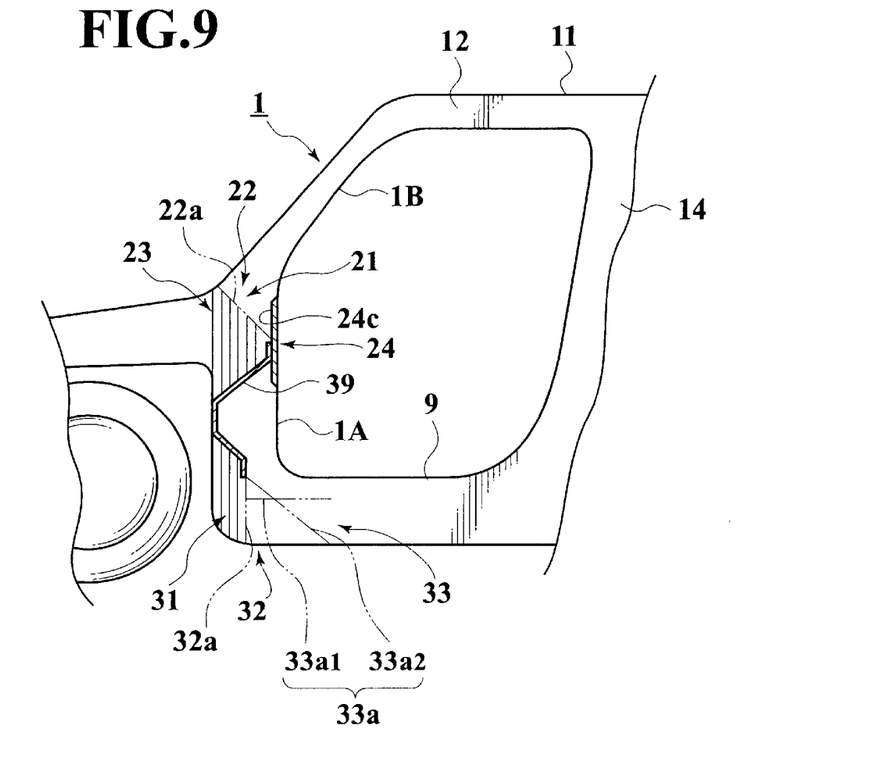
FIG. 9 is a schematic side view of the body structure showing zones of localized reduced structural strength and the provision of reinforcement member in accordance with a third embodiment of the invention.
Figure 10:
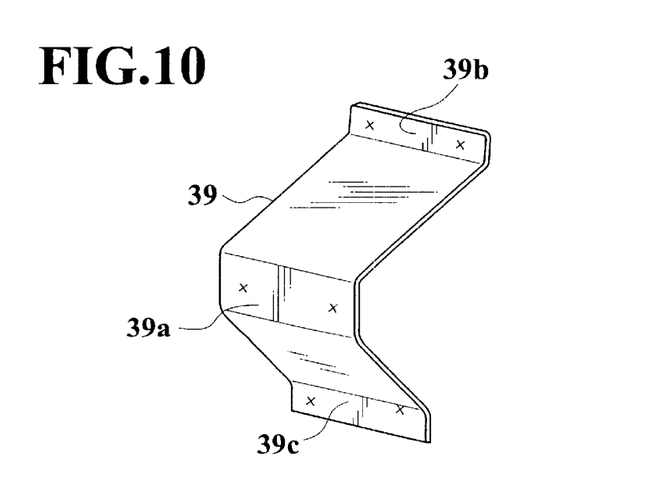
FIG. 10 is a perspective view of a reinforcement member used in the third embodiment of the invention.

FIGS. 9 and 10 show a third embodiment of the invention. According to this embodiment, the angled rib 22a of the load-converting and transmitting member 21 is arranged so as to extend from a junction of the upper wall of the hood ridge member 2 and the front pillar 1 to the rear face or wall of the lower pillar 1A. A reinforcement part or portion 24 is defined by a thickened wall portion 24c which is either integrally formed on, or secured to, a portion of the rear wall of the lower pillar 1A to which the slanted rib 22a is integrated.

According to this embodiment of the invention, a reinforcement member 39 is additionally disposed in the lower pillar intermediate of the upper end which is connected to the hood ridge member 2 and the lower end which is connected to the side sill 9. The provision of the reinforcement member 39, renders it possible to provide both areas of the lower pillar portion which are faced by the slanted or angled rib 22a and the vertical rib 32a (shown by vertical hatching in FIG. 9), with lower relative levels of structural rigidity as compared with that portion which exhibits enhanced structural rigidity due to the provision of the reinforcement member 39. This, in effect, allows these portions to undergo initial deformation and thus provides the weakened parts 23, 31 of the previous embodiments without actually reducing the structural strength of the two zones.

As shown in FIG. 10, the reinforcement member 39 is shaped so as to have a substantially V-shaped configuration. The member 39 has an abutment surface 39a formed at the apex of the V-shaped member and flanges 39b, 39c formed on the upper and lower terminal ends. The abutment surface 39a is welded to the front face of the lower pillar 1A. The upper flange 39b of the member 39 is welded to the base of the thickened part 24c connected to the slanted rib 22a, while the lower flange 39c is welded to the upper end of the vertical rib 32a.

Therefore, also in this embodiment, it is possible to effect the similar characteristics of absorbing the collision energy to that of the first embodiment.

Furthermore, since the slanted or angled rib 22a is arranged so as to extend from the upper wall of the hood ridge member 2 to the rear face of the lower pillar 1A in the junction zone between the lower pillar 1A and the upper pillar 1B, the rigidity of integration therebetween can be enhanced to improve the transmissibility of load from the hood ridge member 2 to the upper pillar 1B.

In addition, since the reinforcement part 24 is constituted by the thickened part 24c on the rear face of the lower pillar 1A, it is possible to establish the appropriate distribution of plate thickness owing to the characteristics of casting products.

Further, since the weakened parts (viz., the areas of relatively lower structural deformation resistance) 23, 31 are established by the addition of the reinforcement member 39, the overall rigidity of the pillar can be enhanced as compared with the previously described embodiments wherein both weakened parts are provided through the use of wall structures wherein the thickness of the walls are deliberately reduced to lower the strength thereof.

Additionally, since the reinforcement member 39 connects the slanted rib 22a with the vertical rib 32a in this embodiment, the reinforcement member 39 provides the same function as the connecting rib 34 of the first embodiment, whereby it is possible to enhance the load-transmission performance of the lower pillar 1A in the vertical direction of the vehicle.

FOURTH EMBODIMENT

Figure 11:
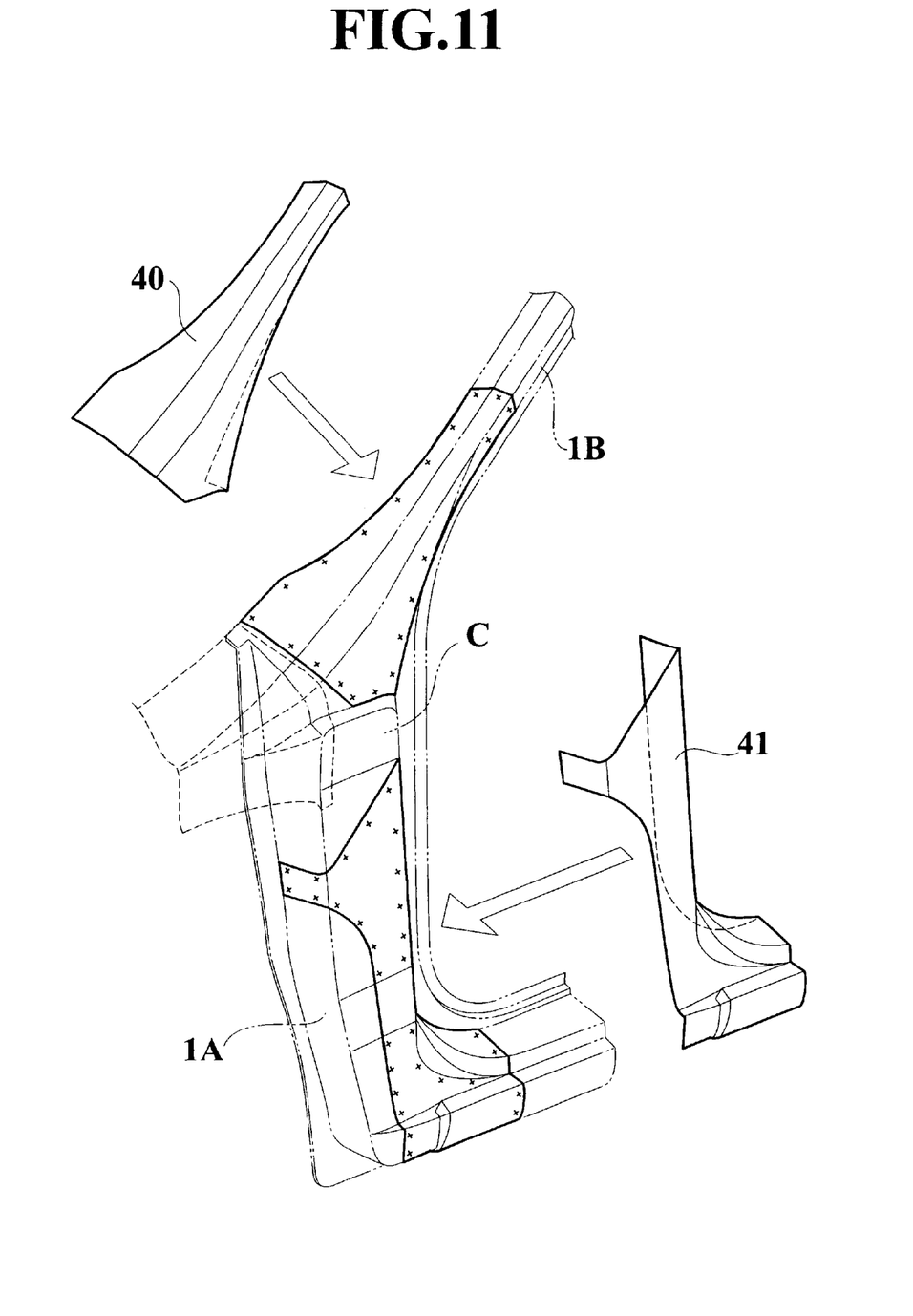
FIG. 11 is a perspective view showing a further embodiment of the invention wherein a reinforcing portion is secured to one or both of the upper side of the hood ridge and upper pillar.

FIG. 11 shows a fourth embodiment of the invention. This arrangement, similar to the third embodiment, establishes a location of increased structural strength which automatically renders other portions relatively lower in resistance to structural deformation and thus achieves the same effect as the previously described embodiments. To increase the strength of the lower portion of the upper pillar portion 1B and/or an upper end portion of the hood ridge member 2, a reinforcement member or gusset 40 is welded or otherwise secured to an inboard edge of these two members in the manner shown in FIG. 11. This gusset 40 in this embodiment is located along and edge of the upper pillar 1B. In addition, another reinforcement member or gusset 41 is secured to an inboard edge of the lower pillar 1A.

The gusset 41 is attached to the upper part of the front pillar and gusset 41 is attached to the lower part of the front pillar. The gussets 40, 41 form more rigid portions, which have a relatively higher rigidity, in the front pillar and center part C. A weakened portion is thus formed between the high rigidity portions. Because gussets 40, 41 are attached to the outer panel of the front pillar, the body structure is constructed rather easily. Moreover, the rigidity is readily adjustable due to the gussets 40, 41 being attached to the outer panel of the front pillar.

Japanese Patent Application No. 2000-66478 upon which this application is based and on which the claim to priority is founded, is incorporated herein by reference thereto.

Although the invention has been described above with reference to only a limited number of embodiments, the invention is not limited thereto and the various modifications and changes which can be made without departing from the scope of the invention will be self-evident to those skilled in the art to which the invention pertains.

What is claimed is:

1. A body structure for a vehicle, comprising:
   a front pillar having a lower pillar portion and an upper pillar portion, the upper pillar portion merging with an upper end of the lower pillar, the upper pillar portion being angled toward a rear of the vehicle with respect to the lower pillar portion;
   a hood ridge member extending longitudinally along a side of the vehicle structure, said hood ridge member having a rear end portion joined to an upper end of the lower pillar portion; and
   a load-converting and force transmitting arrangement comprising:
      a first structural feature which forms part of the front pillar, the first structural feature being arranged to induce structural deformation of a predetermined portion of the lower front pillar portion upon a predetermined amount of force being transmitted thereto through said hood ridge member as a result of a frontal collision of the vehicle, the first structural feature re-orienting at least a rear end portion of the hood ridge member, with respect to the front pillar, to an orientation where the rear end portion of the hood ridge member is at least partially aligned with the angled upper pillar portion and so that force is transmitted from the hood ridge member toward the upper front pillar portion, and a second structural feature which forms part of at least one of the upper and lower pillar portions and which is arranged to receive force from the hood ridge member and to direct the received force along the upper front pillar portion.

2. The body structure for a vehicle as set forth in claim 1, wherein the lower pillar portion and the upper pillar portion comprise a single piece, corrosion resistant, light weight material body.

3. The body structure as set forth in claim 2, wherein the single piece, corrosion resistant, light weight material, body is a cast body.

4. The body structure for a vehicle of claim 1, wherein the second structural feature of the load-converting and force transmitting member includes:

a load-receiving part arranged proximate a position where the upper end of the lower pillar portion is joined to the hood ridge member, the load-receiving part being inclined inside at an angle with respect to the lower pillar portion at an angle which is approximately normal to the direction in which the upper pillar portion is rearwardly angled, and a reinforcement part which supports the load-receiving part and which extends along the upper pillar portion; and wherein the first structural feature includes:

a first portion of reduced structural deformation resistance formed in a front wall portion of an upper portion of the lower pillar portion located proximate a lower wall of the hood ridge member.

5. The body structure for a vehicle of claim 1, wherein the second structural feature of the load-converting and force transmitting member includes:

a load-receiving part arranged proximate a position where the upper end of the lower pillar portion is joined to the hood ridge member, the load-receiving part being inclined inside the lower pillar portion at an angle which is essentially normal to the angle at which the upper pillar portion is angled rearwardly, and a reinforcement part which supports the load-receiving part and which extends along the upper pillar portion; and wherein the first structural feature includes:

a portion of increased deformation resistance which spans a lower front wall portion of the upper side pillar portion and an upper wall portion of the rear end of the hood ridge member.

6. The body structure for a vehicle of claim 4, wherein the load-receiving part comprises an angled rib integrally formed with the lower pillar portion, the angled rib having an upper end which merges with a forward wall of a portion of the upper pillar portion immediately adjacent a site where an upper wall of the hood ridge member is joined to the front pillar.

7. The body structure for a vehicle of claim 4, wherein the reinforcement part comprises a reinforcement rib formed unitarily with at least the upper pillar portion, the reinforcement rib extending from a rear face of the load-receiving part along a predetermined length of the upper pillar portion.

8. The body structure for a vehicle of claim 4, wherein the reinforcement part comprises a reinforcement plate which is non-unitarily formed with the front pillar and which is connected to the load-receiving part and the upper pillar portion and extends from a rear face of the load-receiving part along an interior of the upper pillar.

9. The body structure for a vehicle of claim 6, wherein the angled rib extends from a location at which the upper wall of the hood ridge member is joined to the front pillar, to a rear wall of the lower pillar, and wherein the reinforcement part is tapered and has a wide end portion formed integrally with a rear face of the angled rib.

10. The body structure for a vehicle of claim 4, wherein the lower pillar portion further includes:

a second portion of reduced structural deformation resistance formed in a forward portion of a lower portion of the lower pillar portion at a location which is selected to be normally spaced aft of a front wheel of the vehicle;

a second load-receiving part arranged aft of the second portion of reduced structural deformation resistance for receiving force acting in a fore-and aft direction of the vehicle;

a second reinforcement part which supports the second load-receiving part and which is angled with respect to the second reinforcement part so as to transmit the force from the second reinforcement part to a side sill joined to a lower end of the lower pillar portion.

11. The body structure for a vehicle of claim 10, wherein the second load-receiving part further includes a vertical rib formed unitarily with the lower pillar portion, wherein the side sill and the lower pillar portion are unitarily formed as a single body, and wherein the second reinforcement part includes a reinforcement rib formed unitarily with the lower pillar portion and the side sill and which continuously extends from a rear face of the vertical rib to a location inside the side sill.

12. The body structure for a vehicle of claim 11, wherein the angled rib of the first load receiving part is connected with the vertical rib at the lower end of the lower pillar portion by a connecting rib which is unitarily formed with the lower pillar portion and which extends vertically there through.

13. The body structure for a vehicle of claim 4, wherein the first portion of reduced structural deformation resistance in the lower pillar portion comprises a forward structural wall of the lower pillar portion having a portion having a thickness which is less than a wall thickness of a portion of the lower pillar portion which is located approximately midway between the upper end portion and a lower end portion of the lower pillar portion.

14. The body structure for a vehicle of claim 10, further comprising a reinforcement member disposed in the lower pillar portion between the first and second portions of reduced structural deformation resistance.

15. A body structure for a vehicle for a vehicle comprising;

a front pillar having an essentially upright lower pillar portion and an upper pillar portion which merges with the lower pillar portion and which extends obliquely toward a rear of the vehicle;

a hood ridge member joined to an upper end portion of the lower pillar portion; and load-converting and transmitting means for transmitting force exerted on the hood ridge member in the fore and aft direction of the vehicle by a vehicle collision, to the upper pillar portion while redirecting the force so as to be substantially aligned with the upper pillar portion.

16. The body structure for a vehicle of claim 15, wherein the upper pillar portion and the lower pillar portion, comprise a single unitarily cast non-corrosive lightweight material body.

17. The body structure for a vehicle of claim 15, wherein the load-converting and transmitting means includes:
   a load-receiving part which joins an upper end of the lower pillar portion to the hood ridge member, the load-receiving part being disposed within and inclined with respect to the lower pillar portion, the load-receiving part receiving a vehicular collision generated force acting in the fore an aft direction of the vehicle that acts through at least the hood ridge member;
   a first portion of relatively reduced structural deformation resistance on a forward side of lower front pillar portion which is located below the hood ridge member; and
   a reinforcement part for supporting the load-receiving part.

18. The body structure for a vehicle of claim 15, wherein the reinforcement part includes a reinforcement rib which is unitary with at least one of the upper pillar portion and the lower pillar portion and which continuously extends from a rear face of the load-receiving part along the interior of the upper pillar portion.

19. The body structure for a vehicle of claim 15, wherein the lower pillar further includes:
   a second portion of relatively reduced structural deformation resistance arranged on the front side of a lower end of the lower pillar portion at a location aft of a front wheel of the vehicle;
   a second load-receiving part arranged aft of the second portion of relatively reduced structural deformation resistance for receiving vehicular collision generated force which acts in the fore and aft direction of the vehicle;
   a second reinforcement part which supports the second load-receiving part and which transmits the force to a side sill joined to the lower end of the lower pillar portion.

20. The body structure for a vehicle of claim 17, wherein the first portion of relatively reduced structural deformation resistance in the lower pillar portion comprises a wall portion having a thickness which is different from adjacent portions of the wall.

21. The body structure for a vehicle of claim 19, further comprising a reinforcement member disposed in a section of the lower pillar portion between the first and second portions of relatively reduced structural deformation resistance to increase a relative rigidity and resistance to structural deformation of the section of the lower pillar portion between the first and second portions of relatively reduced structural deformation resistance.

22. A body structure for a vehicle, comprising:
   a pair of left and right front pillars each having an essentially upright lower pillar portion and an upper pillar portion which merges with a lower pillar portion, each of the upper pillar portions being obliquely angled toward a rear of the vehicle;
   a pair of left and right hood ridge members each joined to an upper end of a lower pillar portion;
   a dash cross-member disposed between the left and right front pillars;
   a pair of left and right front side members each having an aft end connected to an end of the dash cross member;
   a first cross-member interconnecting forward ends of the left and right front side members;
   a pair of left and right strut tower members respectively arranged adjacent the left and right hood ridge members and respectively connecting a hood ridge member with a front side member and the dash cross member;
   a pair of left and right side floor sills respectively connected to lower ends of the left and right lower pillars, the left and right side floor sills forming part of a floor structure;
   a pair of left and right side roof rails respectively connected to upper ends of the upper pillar portions;
   a front roof rail interconnecting forward ends of the left and right side roof rails;
   a roof panel disposed on and connected to, the left and right side roof rails and the front roof rail;
   a pair of left and right center pillars each extending between a side roof rail and a side sill;
   a pair of load-converting and transmitting members respectively associated with a lower pillar portion, each of the load-converting and transmitting members respectively transmitting vehicular collision force that passes through a hood ridge member, to an upper pillar portion while changing a direction in which the force is transmitted to a direction which is substantially aligned with an upper pillar portion so as to be directed therealong.

* * * * *